Figure 1:
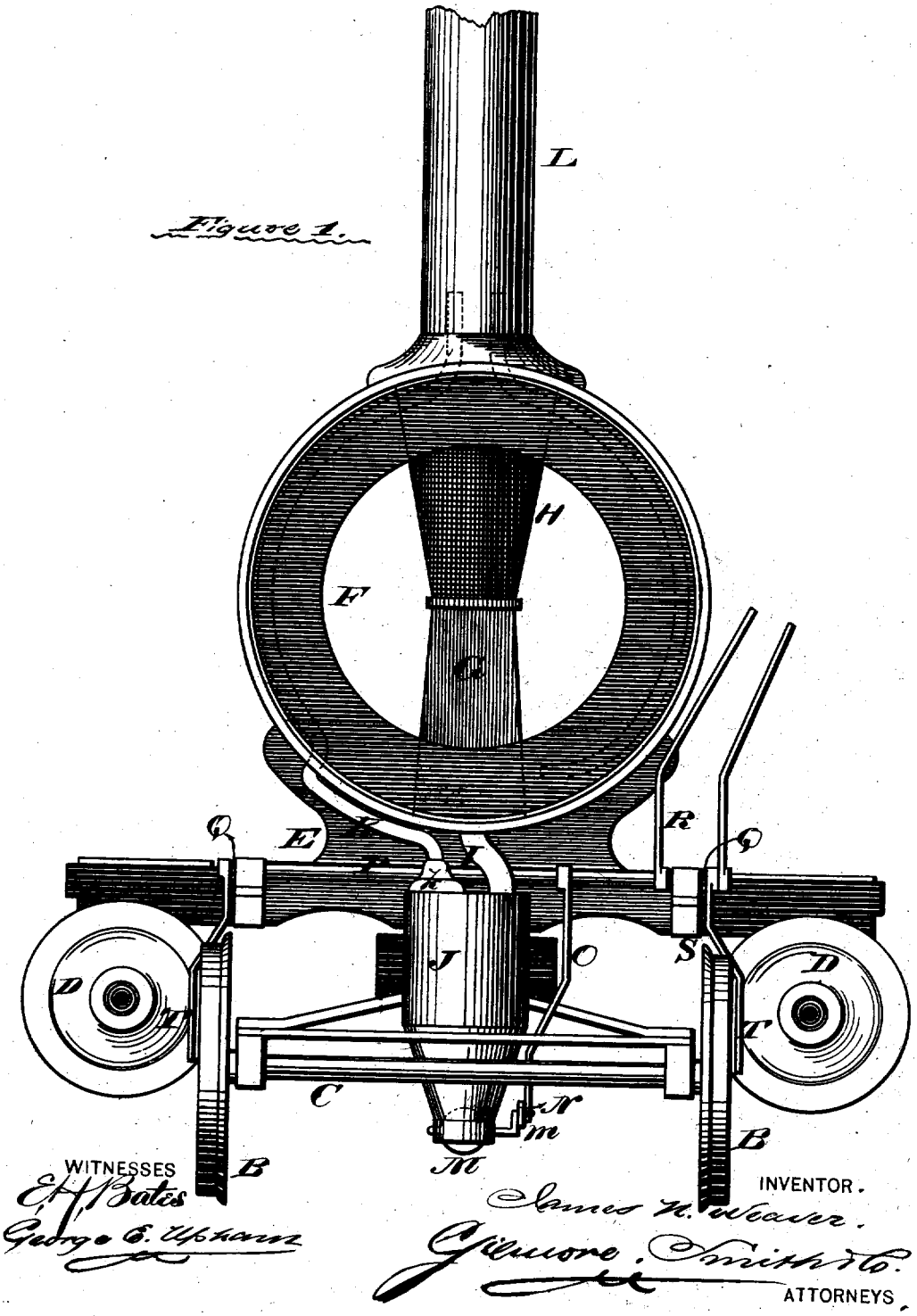

2 Sheets—Sheet 1.

J. N. WEAVER.

SPARK-ARRESTERS.

No. 7,717.

Reissued May 29, 1877.

WITNESSES

E. H. Bates

George E. Upham

INVENTOR.

James N. Weaver.

Gilmore, Smith & Co.

ATTORNEYS.

N. PETERS, PHOTO-LITHOGRAPHER, WASHINGTON, D. C.

2 Sheets—Sheet 2.
J. N. WEAVER.
SPARK-ARRESTERS.
No. 7,717.
Reissued May 29, 1877.
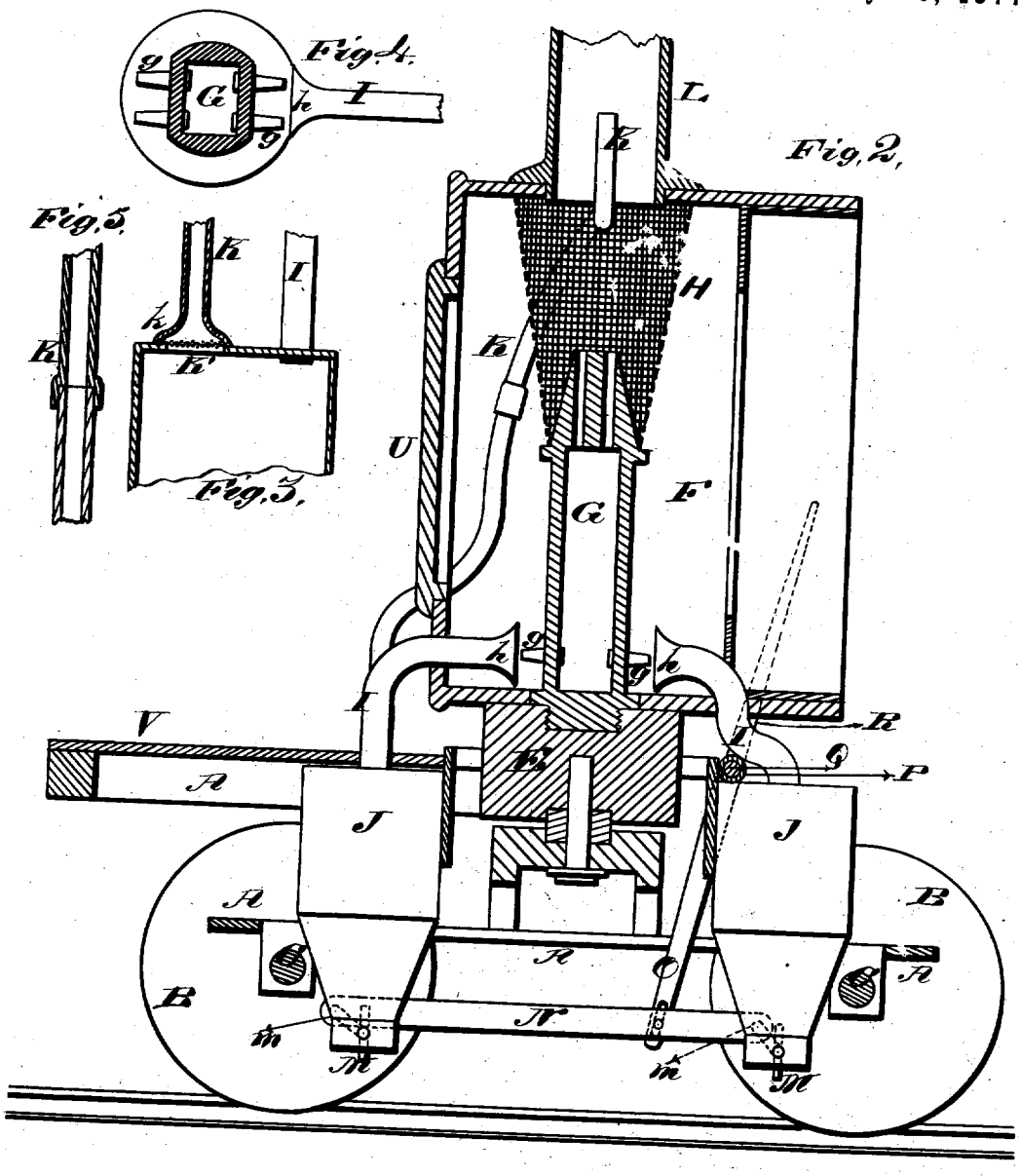
WITNESSES
E. J. Bates
George E. Upham
INVENTOR.
James N. Weaver.
Gilmore & Smith & Co.
ATTORNEYS
N. PETERS, PHOTO-LITHOGRAPHER, WASHINGTON, D. C.

UNITED STATES PATENT OFFICE.

JAMES N. WEAVER, OF WAVERLY, NEW YORK.

IMPROVEMENT IN SPARK-ARRESTERS.

Specification forming part of Letters Patent No. 183,436, dated October 17, 1876; reissue No. 7,717, dated May 29, 1877; application filed January 27, 1877.

*To all whom it may concern:*

Be it known that I, JAMES N. WEAVER, of the village of Waverly, in the county of Tioga and State of New York, have invented a new and valuable Improvement in Spark-Arresters for Hard and Soft Coal Burning Locomotives; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a rear view of my spark-arrester applied to a locomotive, and Fig. 2 is a central vertical sectional view of the same. Figs. 3, 4, and 5 are detail views thereof.

This invention relates to spark-arresters for locomotive steam-engines.

The nature of said invention consists in the combination of spark-receiving chambers, with pipes leading from the smoke-box to said chambers; also, in the combination of said spark-receiving chambers with pipes leading from the smoke-box to said chambers; also, in the combination of said spark-receiving chambers or spark-receivers, with pipes connecting them to the smoke-stack, for the purpose of allowing the escape of steam; and, finally, in various auxiliary devices and the combination of the parts and elements hereinafter fully set forth.

In the annexed drawings, A designates the truck-frame of a locomotive-engine, and B B designate the wheels, and C C the axle, of said truck.

D D are ordinary operating-cylinders, suspended by saddle E, which saddle supports a cylindrical smoke-box, F, that is secured in front of a boiler. (Not shown.) G represents an exhaust-nozzle, communicating with said cylinders D D and opening into a wire-netting, H, which is shaped like an inverted cone, and attached by its larger extremity to the inside of the upper part of said smoke-box. Said exhaust-nozzle extends upward from the bottom of said smoke-box into the lower and smaller end of said wire netting or cone. To the sides of said exhaust-nozzle G, fronting forward and backward relatively to the motion of the train, are fixed exit-tubes *g g*, two of said tubes being on one side thereof, and two on the other side. Each pair of said tubes discharges steam directly into the flaring or bell-shaped mouth *h* of a spark-conducting tube, I, which communicates at its lower end with a spark-receiver, J. Said receiver J is constructed (air-tight) entirely of metal, and hung firmly to saddle E. There are two of such spark-receivers, closely resembling each other in construction, arrangement, and operation. One of them is attached in front of smoke-box F, and the other in the rear of said smoke-box. The two spark-conducting tubes I I are also substantially counterparts of one another. The dead sparks and cinders that settle by gravity in the bottom of smoke-box F are blown by means of the exhaust steam (passing through nozzle G and side exit tubes *g g*) into spark-conducting tubes I I, whence they pass into receivers J J.

A certain amount of exhaust steam passes with said cinders into said receivers, and this steam is removed by means of pipes K K, which extend from such receivers to the smoke-stack L. Said smoke-stack extends down, through the top of said smoke-box F, into the upper end of said conical wire-netting H, so that said netting prevents unextinguished sparks from passing up through said smoke-stack. The bottoms of said receivers J J are closed by butterfly-valves M M, the pivotal rods of which are provided with crank-arms *m m*. Said crank-arms are connected together by a longitudinal rod or bar, N, which is secured to, and operated by, the lower end of an arm, O, depending from a sleeve, P, that surrounds a shaft, Q. Said sleeve is provided with an upright lever or handle, R. When said lever or handle R is rocked backward or forward upon said shaft longitudinal motion is given to rod or bar N, and valves M M are thereby operated, opening or closing, according to the direction of the oscillation of said lever or handle R.

When said valves open the cinders in said receivers fall to the ground. When said valves are closed the sparks and cinders are retained, giving time for the former to be all extinguished before making their exit. Said shaft Q is pivoted in or upon lugs, arms, or plates S S, extending to the rear from saddle E, and said shaft is provided with arms T T, whereby it can be rotated for the purpose of operating the cylinder-valves. Said receivers J J taper downward from about the middle of each of the said butterfly-valves M M, to insure the discharge of the cinders and the other substances contained in said receivers. Said valves, by means of lever-handle R and the other described connections, may be operated from the cab of the engine.

U designates a door, which gives access to smoke-box F. V designates a front platform, which affords an additional means of suspension for one of the spark-receivers J.

The above-described devices may be applied to stationary engines, as well as to locomotive ones. They may also be modified in various ways. For instance, the number of steam-exit tubes *g g* may be reduced to two, or even to only one. Also, there may be only a single spark-receiver, the tubes conveying steam and sparks being correspondingly diminished in number.

A slide-valve, or any other suitable form of valve, may be substituted for each of the butterfly-valves M M. Lever-handle R may be attached to a rocking shaft, instead of a rocking sleeve, as shown. Pipes K K may be constructed in sections, as shown, or each of them may consist of a single length. The steam is drawn up through them by the action of the steam passing up the exhaust-nozzle G and smoke-stack L. Each of said pipes is provided at the lower end with a flaring mouth, *k*, in which is placed a wire screen or strainer, K′, (shown in Fig. 3,) which screen prevents cinders and other injurious particles from being drawn up through said pipe with the steam from the spark-receiver with which it communicates. The upper ends of said pipes K K communicate with the smoke-stack through the wire-netting above described.

What I claim as new, and desire to secure by Letters Patent, is—

1. A spark-receiver, into which sparks are forced by a jet of steam, located beneath the smoke-box, and provided with suitable openings for the escape of steam, substantially as and for the purpose set forth.

2. The combination of an exhaust-nozzle, a steam-jet, a spark-receiver, provided with openings for the escape of steam, and a pipe between said jet and receiver, substantially as described.

3. Spark-receiver J, in combination with steam-conducting pipe K, smoke-stack L, and exhaust-nozzle G, whereby the steam is drawn from said spark-receiver, substantially as set forth.

4. The combination of receivers J J with valves M, crank-arms *m m*, connecting rod or bar N, arm O, rocking sleeve or shaft Q, and operating-lever R, substantially as set forth.

5. The combination, with receivers J, of steam-conducting pipe K, having lower bell-shaped mouth *k* and wire-screen K′, and with exhaust-nozzle G and smoke-stack L, substantially as and for the purpose set forth.

In testimony that I claim the above I have hereunto subscribed my name in the presence of two witnesses.

JAMES N. WEAVER.

Attest:

CHARLES C. BROOKS,
J. NEWTON DEXTER.